United States Patent
Kilinc et al.

(10) Patent No.: US 11,121,831 B2
(45) Date of Patent: Sep. 14, 2021

(54) METHODS AND NODES FOR PACKET DUPLICATION RELATING TO CARRIER AGGREGATION IN A WIRELESS COMMUNICATION NETWORK

(71) Applicant: Telefonaktiebolaget LM Ericsson (publ), Stockholm (SE)

(72) Inventors: Caner Kilinc, Luleå (SE); Torsten Dudda, Aachen (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 8 days.

(21) Appl. No.: 16/487,483

(22) PCT Filed: Feb. 21, 2018

(86) PCT No.: PCT/SE2018/050168
§ 371 (c)(1),
(2) Date: Aug. 21, 2019

(87) PCT Pub. No.: WO2018/156074
PCT Pub. Date: Aug. 30, 2018

(65) Prior Publication Data
US 2020/0007281 A1  Jan. 2, 2020

Related U.S. Application Data

(60) Provisional application No. 62/463,283, filed on Feb. 24, 2017.

(51) Int. Cl.
*H04L 5/00* (2006.01)
*H04W 36/00* (2009.01)
*H04L 1/18* (2006.01)

(52) U.S. Cl.
CPC .......... *H04L 5/0032* (2013.01); *H04L 1/1887* (2013.01); *H04L 5/001* (2013.01); *H04L 5/0098* (2013.01); *H04W 36/0069* (2018.08)

(58) Field of Classification Search
CPC .... H04L 1/1887; H04L 1/1854; H04L 5/0098
See application file for complete search history.

(56) References Cited

U.S. PATENT DOCUMENTS 8,837,526 B2 * 9/2014 Li ............................ H04L 5/001
370/482
2012/0257570 A1 * 10/2012 Jang ...................... H04L 1/1851
370/328
(Continued)

FOREIGN PATENT DOCUMENTS

WO 2015115854 A1 8/2015

OTHER PUBLICATIONS

Unknown, Author, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.12.0, Dec. 2014, pp. 1-195.
(Continued)

Primary Examiner — Raj Jain
(74) Attorney, Agent, or Firm — Sage Patent Group

(57) ABSTRACT

There is provided a method in a node for a wireless communication network. The node is configurable with a plurality of radio carriers for radio transmission between the node and one or more other nodes of the wireless communication network. The plurality of radio carriers comprises at least a first carrier and a second carrier. The node is operable according to a protocol stack comprising at least a first layer and a second layer, wherein the second layer is higher than the first layer. The first layer is responsible for aggregation of the first and second radio carriers, and the second layer is responsible for duplication of data packets for transmission over the first and second carriers. The method comprises determining, at a first entity of the first layer, that the second carrier is activated or deactivated; and sending, from the first
(Continued)

entity of the first layer to a first entity of the second layer, an indication of the activation or deactivation of the second carrier.

12 Claims, 5 Drawing Sheets

(56) References Cited

U.S. PATENT DOCUMENTS

| | | | |
|---|---|---|---|
| 2015/0181638 A1 | 6/2015 | Tabet et al. | |
| 2016/0044735 A1* | 2/2016 | Ohta | H04W 76/15 455/422.1 |
| 2016/0057585 A1* | 2/2016 | Horn | H04L 45/245 370/312 |
| 2019/0021060 A1* | 1/2019 | Isogawa | H04W 52/367 |
| 2020/0007281 A1* | 1/2020 | Kilinc | H04L 5/001 |

OTHER PUBLICATIONS

Unknown, Author, "3rd Generation Partnership Project; Technical Specification Group Services and System Aspects; Feasibility Study on New Services and Markets Technology Enablers for Critical Communications; Stage 1 (Release 14)", 3GPP TR 22.862 V14.1.0 (Sep. 2016), Sep. 2016, pp. 1-31.

Unknown, Author, "Activation and Deactivation of UL PDCP duplication", 3GPP TSG-RAN WG2 #98, R2-1705266, Hangzhou, China, May 15-19, 2017, pp. 1-3.

Unknown, Author, "Consideration on the activation/deactivation of data duplication for CA", 3GPP TSG-RAN WG2 Meeting #98, R2-1704660, Hangzhou, China, May 15-19, 2017, pp. 1-3.

Unknown, Author, "Data duplication in lower layers (HARQ)", 3GPP TSG-RAN WG2 #97, Tdoc R2-1702032 (Revision of R2-1700833), Athens, Greece, Feb. 13-17, 2017, pp. 1-6.

Unknown, Author, "Further aspects of data duplication in PDCP layer", 3GPP TSG-RAN WG2 #97, Tdoc R2-1700834, Athens, Greece, Feb. 13-17, 2017, pp. 1-3.

Unknown, Author, "On URLLC design principles", TSG-RAN WG1 #86, R1-167061, Gothenburg, Sweden, Aug. 22-26, 2016, pp. 1-5.

Unknown, Author, "Packet Duplication at PDCP", 3GPP TSG-RAN WG2 Meeting #97, R2-1701186, Athens, Greece, Feb. 13-17, 2017, pp. 1-2.

* cited by examiner

METHODS AND NODES FOR PACKET DUPLICATION RELATING TO CARRIER AGGREGATION IN A WIRELESS COMMUNICATION NETWORK

TECHNICAL FIELD

Embodiments of the present disclosure relate to methods and apparatus in a wireless communication network, and particularly to methods and apparatus relating to carrier aggregation in a wireless communication network.

BACKGROUND

Efforts are on-going to develop and standardize communications networks and protocols intended to meet the requirements set out for the fifth generation (5G) of wireless systems, as defined by the Next Generation Mobile Networks Alliance. Such networks are expected to support a large number of use cases, with different use cases having widely different requirements in terms of the service provided by the network.

Ultra-reliable low latency communication (URLLC) is one of the 5G use cases defined in a technical report prepared by the 3GPP (see, "Feasibility Study on New Services and Markets Technology Enablers for Critical Communications", TR 22.862, v 14.1.0). In this category, communications demand both high reliability and low latency. However, this is difficult as such requirements are mutually conflicting. Usually, the two aspects could be traded off against each other, i.e. a message can be transmitted with very high reliability if latency is not a concern, or with very low latency if reliability is not a concern. However, for URLLC both constraints should be met simultaneously, and this poses a remarkable challenge for user-plane (UP) design.

According to the technical report cited above, the latency requirements for URLLC may range from 1 ms to 10 ms for different applications, including automation applications, smart grid, and intelligent transportation (as examples). Reliability requirements may range from a residual error rate of $10^{-4}$, $10^{-6}$, to $10^{-9}$ (i.e., one error for every 10,000 successful transmissions, 1,000,000 transmissions, or 1,000,000,000 transmissions). It is further noted that such residual error rate calculation may regard those packets delivered later than the required latency bound (such as 1 ms or 10 ms, for example) as errors or invalid transmissions in the context of URLLC traffic. Simultaneously achieving such high demands on both reliability and latency may impact many layers and components of both the radio-access network (RAN) and the core network.

URLLC can be regarded as an extremely high quality of service (QoS) use case both in RAN and the core network.

In Long Term Evolution (LTE) and also for the new, developing 5G standard, a combination of radio link control (RLC) and hybrid automated repeat request (HARQ) attains a good combination of low round trip time and a modest feedback overhead, where the two mechanisms complement each other. Retransmission in LTE, existing in both RLC and HARQ, is tightly integrated and can be seen as one retransmission with two feedbacks. The combination achieves fast (due to HARQ) and reliable transmission (due to RLC). However, RLC operates per logical channel, while HARQ operates per transport channel (per component carrier).

Multi-connectivity (MC) can be defined to include all radio schemes involving more than one radio link to serve a wireless terminal for uplink (UL), downlink (DL) or both UL and DL. In LTE and also the developing 5G standard, MC can include mechanisms such as dual-connectivity (DC), and carrier aggregation (CA) from a system architecture perspective, which are applicable to both collocated radio-access network nodes and non-collocated radio-access network nodes. Characteristically, MC can contribute to URLLC in at least two aspects:

i) boosting reliability without sacrificing latency performance;

ii) removing the interruption time otherwise caused by mobility (i.e. movement of the wireless terminal device from one cell to another).

MC may be able to obtain gains in reliability and latency that any link-level diversity scheme by its own cannot achieve. Therefore MC may be particularly interesting as a solution to meet the latency and reliability requirements of URLLC traffic, whether in UL or DL, although UL MC may have limiting factors, such as the available transmit power of the wireless terminal.

Just like any radio network, one of the objectives of LTE is to provide a high data-rate, low latency, packet-optimized system with improved system capacity and coverage. In order to achieve this, the concept of carrier aggregation (CA) was introduced in LTE Rel10. CA is also expected to be standardized for the developing 5G standards.

CA is a very successful feature in LTE which improves both system capacity and user performance. In LTE CA, a UE is served with more than one component carrier (CC), with one carrier called PCell (Primary Cell) and another remaining carriers called SCells (Secondary Cells). When CA is configured, the wireless terminal has only one radio resource control (RRC) connection with the network. Further detail can be found in section 7.5 of 3GPP TS36.300 (v 10.12.0).

One mechanism that has been proposed to achieve high reliability and low latency is the duplication of data packets in the packet data convergence protocol (PDCP) layer. Such a mechanism may re-use the split bearer architecture for dual connectivity, with duplicate packets being transmitted over different carriers (or component carriers). This way, duplication can be applied flexibly to scenarios with centralized and non-centralized PDCP, scenarios with different backhaul latencies and different scheduler implementations, i.e. in principle also to integration between LTE systems and the developing 5G systems.

SUMMARY

As noted above, highly reliable transmissions with a very low block error rate (BLER) are targeted for ULRRC traffic (e.g. $10^{-5}$ residual error). PDCP duplication helps to maintain this low residual error rate, in cases where a wireless terminal device cannot be reached on one of the carriers e.g. due to a temporary outage/fading dip, or due to unanticipated change or wrong channel state information.

One problem that has been identified with this proposal is that carrier aggregation is not visible for RLC and PDCP layers, i.e. those layers above the medium access control (MAC) layer that manages carrier aggregation. Thus duplication of data packets (i.e. in the PDCP layer) may happen even though carrier aggregation is not configured, or duplication may not happen even though carrier aggregation is configured.

Embodiments of the disclosure provide methods and nodes, such as wireless terminal devices and network nodes (e.g. eNodeBs or gNodeBs, or servers coupled to such nodes), that alleviate one of more of the problems identified above.

In one aspect, there is disclosed a method in a node for a wireless communication network, the node being configurable with a plurality of radio carriers for radio transmission between the node and one or more other nodes of the wireless communication network, the plurality of radio carriers comprising at least a first carrier and a second carrier, the node being operable according to a protocol stack comprising at least a first layer and a second layer, wherein the second layer is higher than the first layer, wherein the first layer is responsible for aggregation of the first and second radio carriers, and wherein the second layer is responsible for duplication of data packets for transmission over the first and second carriers. The method comprises: determining, at a first entity of the first layer, that the second carrier is activated or deactivated; and sending, from the first entity of the first layer to a first entity of the second layer, an indication of the activation or deactivation of the second carrier.

In another aspect, there is provided a method in a node for a wireless communication network, the node being configurable with a plurality of radio carriers for radio transmission between the node and one or more other nodes of the wireless communication network, the plurality of radio carriers comprising at least a first carrier and a second carrier, the node being operable according to a protocol stack comprising at least a first layer and a second layer, wherein the second layer is higher than the first layer, wherein the first layer is responsible for aggregation of the first and second radio carriers, and wherein the second layer is responsible for duplication of data packets for transmission over the first and second carriers. The method comprises: receiving, at a first entity of the second layer, an instruction to commence or cease duplication of packets over the first and second carriers; and sending, from the first entity of the second layer to a first entity of the first layer, a request to activate or deactivate the second carrier.

In a further aspect, there is provided a node for a wireless communication network, the node being configurable with a plurality of radio carriers for radio transmission between the node and one or more other nodes of the wireless communication network, the plurality of radio carriers comprising at least a first carrier and a second carrier, the node being operable according to a protocol stack comprising at least a first layer and a second layer, wherein the second layer is higher than the first layer, wherein the first layer is responsible for aggregation of the first and second radio carriers, and wherein the second layer is responsible for duplication of data packets for transmission over the first and second carriers. The node is configured to: determine, at a first entity of the first layer, that the second carrier is activated or deactivated; and send, from the first entity of the first layer to a first entity of the second layer, an indication of the activation or deactivation of the second carrier.

In another aspect, there is provided a node for a wireless communication network, the node being configurable with a plurality of radio carriers for radio transmission between the node and one or more other nodes of the wireless communication network, the plurality of radio carriers comprising at least a first carrier and a second carrier, the node being operable according to a protocol stack comprising at least a first layer and a second layer, wherein the second layer is higher than the first layer, wherein the first layer is responsible for aggregation of the first and second radio carriers, and wherein the second layer is responsible for duplication of data packets for transmission over the first and second carriers. The node is configured to: receive, at a first entity of the second layer, an instruction to commence or cease duplication of packets over the first and second carriers; and send, from the first entity of the second layer to a first entity of the first layer, a request to activate or deactivate the second carrier.

One aspect provides a node for a wireless communication network, the node being configurable with a plurality of radio carriers for radio transmission between the node and one or more other nodes of the wireless communication network, the plurality of radio carriers comprising at least a first carrier and a second carrier, the node being operable according to a protocol stack comprising at least a first layer and a second layer, wherein the second layer is higher than the first layer, wherein the first layer is responsible for aggregation of the first and second radio carriers, and wherein the second layer is responsible for duplication of data packets for transmission over the first and second carriers, the node comprising processing circuitry and a non-transitory machine-readable medium storing code which, when executed by the processing circuitry, causes the node to: determine, at a first entity of the first layer, that the second carrier is activated or deactivated; and send, from the first entity of the first layer to a first entity of the second layer, an indication of the activation or deactivation of the second carrier.

Another aspect provides a node for a wireless communication network, the node being configurable with a plurality of radio carriers for radio transmission between the node and one or more other nodes of the wireless communication network, the plurality of radio carriers comprising at least a first carrier and a second carrier, the node being operable according to a protocol stack comprising at least a first layer and a second layer, wherein the second layer is higher than the first layer, wherein the first layer is responsible for aggregation of the first and second radio carriers, and wherein the second layer is responsible for duplication of data packets for transmission over the first and second carriers, the node comprising processing circuitry and a non-transitory machine-readable medium storing code which, when executed by the processing circuitry, causes the node to: receive, at a first entity of the second layer, an instruction to commence or cease duplication of packets over the first and second carriers; and send, from the first entity of the second layer to a first entity of the first layer, a request to activate or deactivate the second carrier.

A further aspect provides a node for a wireless communication network, the node being configurable with a plurality of radio carriers for radio transmission between the node and one or more other nodes of the wireless communication network, the plurality of radio carriers comprising at least a first carrier and a second carrier, the node being operable according to a protocol stack comprising at least a first layer and a second layer, wherein the second layer is higher than the first layer, wherein the first layer is responsible for aggregation of the first and second radio carriers, and wherein the second layer is responsible for duplication of data packets for transmission over the first and second carriers. The node comprises: a first module, in a first entity of the first layer, configured to determine that the second carrier is activated or deactivated; and a second module, in the first entity of the first layer, configured to send an indication of the activation or deactivation of the second carrier to a first entity of the second layer.

Another aspect provides a node for a wireless communication network, the node being configurable with a plurality of radio carriers for radio transmission between the node and one or more other nodes of the wireless communication network, the plurality of radio carriers comprising at least a first carrier and a second carrier, the node being operable according to a protocol stack comprising at least a first layer and a second layer, wherein the second layer is higher than the first layer, wherein the first layer is responsible for aggregation of the first and second radio carriers, and wherein the second layer is responsible for duplication of data packets for transmission over the first and second carriers. The node comprises: a first module, in a first entity of the second layer, configured to receive an instruction to commence or cease duplication of packets over the first and second carriers; and a second module, in the first entity of the second layer, configured to send a request to activate or deactivate the second carrier to a first entity of the first layer.

Note that the discussion below focuses on a technical solution for LTE and those networks intended to meet the requirements set out for the fifth generation (5G) of wireless systems, as defined by the Next Generation Mobile Networks Alliance. However, those skilled in the art will appreciate that it is also possible to apply the methods and apparatus described herein to other networks and access technologies. In other networks, nodes and interfaces may have different names.

DETAILED DESCRIPTION

Figure 1:
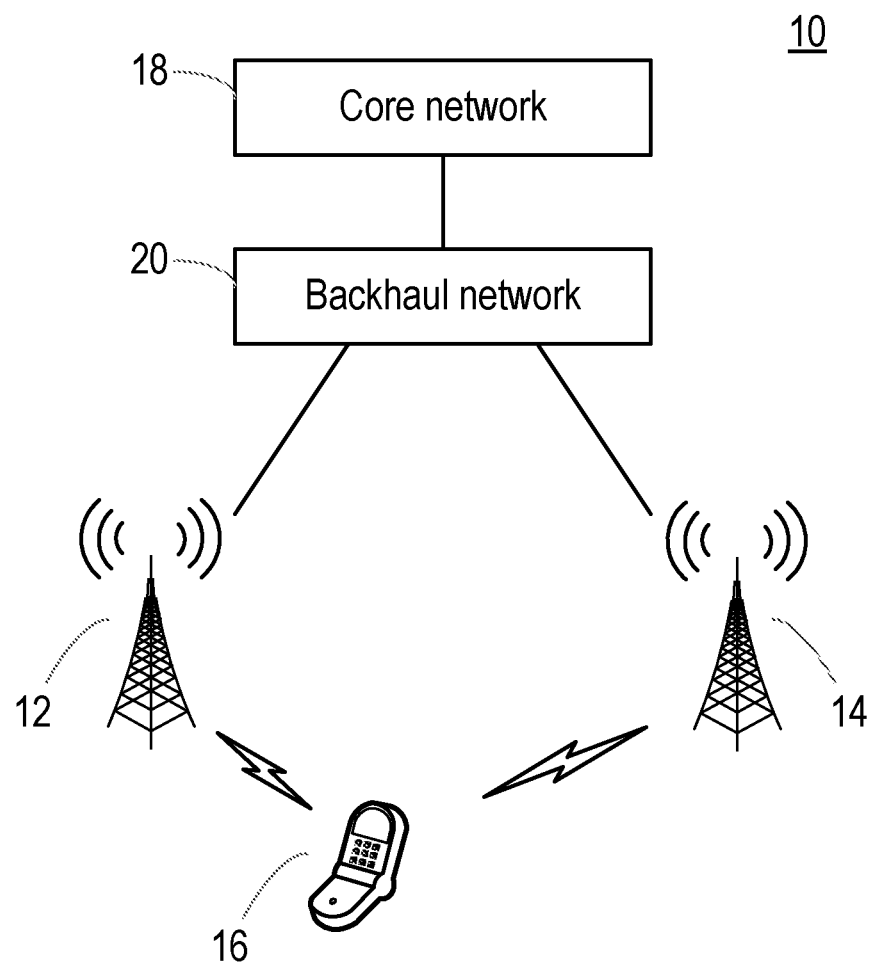
FIG. 1 shows a wireless communications network.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for a wireless terminal, or user equipment (UE), it should be understood by the skilled in the art that "UE" is a non-limiting term comprising any mobile or wireless device, terminal or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device", "terminal device" and "wireless terminal device" may be used interchangeably in the following description, and it will be appreciated that such a device does not necessarily have to be 'mobile' in the sense that it is carried by a user. Examples of UE are target device, device to device (D2D) UE, machine type UE or UE capable of machine to machine (M2M) communication, PDA, tablet computer, mobile terminals, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrowband Internet of Things (NB-IoT) UE, UE Cat NB1, etc.

In some embodiments a more general term "network node" is used and it can correspond to any type of radio access node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, test equipment, etc. Moreover, where the following description refers to steps taken in or by a network node or a radio access node, this also includes the possibility that some or all of the processing and/or decision making steps may be performed in a device that is physically separate from the radio antenna of the node, but is logically connected thereto. Thus, where processing and/or decision making is carried out "in the cloud", the relevant processing device is considered to be part of the node for these purposes.

The embodiments are described for LTE or LTE based systems such as machine-type communication (MTC), evolved MTC (eMTC), NB-IoT etc. As an example MTC UE, eMTC UE and NB-IoT UE also called UE category 0, UE category M1 and UE category NB1. However, the embodiments are applicable to any RAT or multi-RAT systems, where the UE receives and/or transmit signals (e.g. data) e.g. LTE FDD/TDD, WCDMA/HSPA, GSM/GERAN, Wi-Fi, WLAN, CDMA2000, 5G, NR, etc. It is recalled that 5G, the fifth generation of mobile telecommunications and wireless technology is not yet fully defined but in an advanced draft stage within 3GPP. It includes work on 5G New Radio (NR) Access Technology. LTE terminology is used in this disclosure in a forward looking sense, to include equivalent 5G entities or functionalities although a different term is specified in 5G. A general description of the agreements on 5G New Radio (NR) Access Technology so far is contained in most recent versions of the 3GPP 38-series Technical Reports.

FIG. 1 shows a network 10 that may be utilized to explain the principles of embodiments of the present disclosure. The network 10 comprises first and second radio access nodes 12, 14 which are connected, via a backhaul network 20, to a core network 18. FIG. 1 also shows a wireless terminal (or UE, etc) 16 that is in wireless communication with at least the first radio access node 12. In the illustrated embodiment, the wireless terminal 16 is also in wireless communication with the second radio access node 14.

The radio access nodes 12, 14 may be referred to as e.g. base stations, NodeBs, evolved NodeBs (eNB, or eNodeB), gNodeBs, base transceiver stations, Access Point Base Stations, base station routers, Radio Base Stations (RBSs), macro base stations, micro base stations, pico base stations, femto base stations, Home eNodeBs, relays and/or repeaters, beacon devices or any other network node configured for communication with wireless devices over a wireless interface, depending e.g. on the radio access technology and terminology used.

The wireless terminal 16 is configurable to communicate with the network 10 via a plurality of carriers, and thus the wireless terminal 16 is configurable to establish one or more radio carriers with the radio access nodes 12, 14. For example, the wireless terminal 16 may be configured with a plurality of carriers with the first radio access node 12, or may be configured with one or more carriers with the first radio access node 12 and one or more carriers with the second radio access node 14. Messages transmitted by the wireless terminal 16 to a radio access node 12, 14 are said to be transmitted in the "uplink", while messages transmitted by the radio access node 12, 14 to the wireless terminal 16 are said to be transmitted in the "downlink".

In one particular embodiment, the wireless terminal 16 is configured with a plurality of carriers and these carriers are said to be "aggregated". As will be known to the skilled person, the carriers can be of different bandwidths. The carriers may be defined using a contiguous range of frequency within the same operating frequency band, or a non-contiguous allocation of frequency either in the same operating frequency band (i.e. the carriers belong to the same operating frequency band, but have a gap, or gaps, in between), or in different operating frequency bands.

The plurality of carriers comprises a primary carrier or cell (also known as PCell) and one or more secondary carriers or cells (also known as SCells). For example, the RRC connection with the network 10 may be signalled via the primary carrier, as well as other information such as NAS signalling of security parameters. The plurality of carriers may be operated by one or more of the radio access nodes 12, and thus the wireless terminal 16 may communicate wirelessly with one or more network nodes at the same time. For example, if the wireless terminal 16 has a first (primary) carrier established with the first radio access node 12, a second (secondary) carrier may be established between the wireless terminal 16 and the first radio access node 12 (i.e. more than one carrier is established with the same network node), or the second radio access node 14. Further carriers may also be established.

In one particular embodiment of the disclosure, the wireless terminal 16 aggregates a plurality of carriers for communication with a single radio access node, e.g. the radio access node 12.

The carriers may be used for the transmission of uplink signals, downlink signals, or both uplink and downlink signals. Thus a carrier which is operated by the first radio access node 12, for example, may be used for transmitting signals from the first radio access node 12 to the wireless terminal 16 (i.e. downlink), receiving signals at the first radio access node 12 from the wireless terminal 16 (i.e. uplink), or both uplink and downlink transmissions. For example, a carrier may be used for transmitting as well as receiving signals in different time resources, e.g. when configured as a time division duplex (TDD) carrier. In another example, a carrier may further comprise first and second sub-carriers having different frequencies, where the first sub-carrier is used by the radio access node for transmitting signals (i.e. DL signals) and the second sub-carrier is used for receiving signals (i.e. UL signals).

Figure 2:
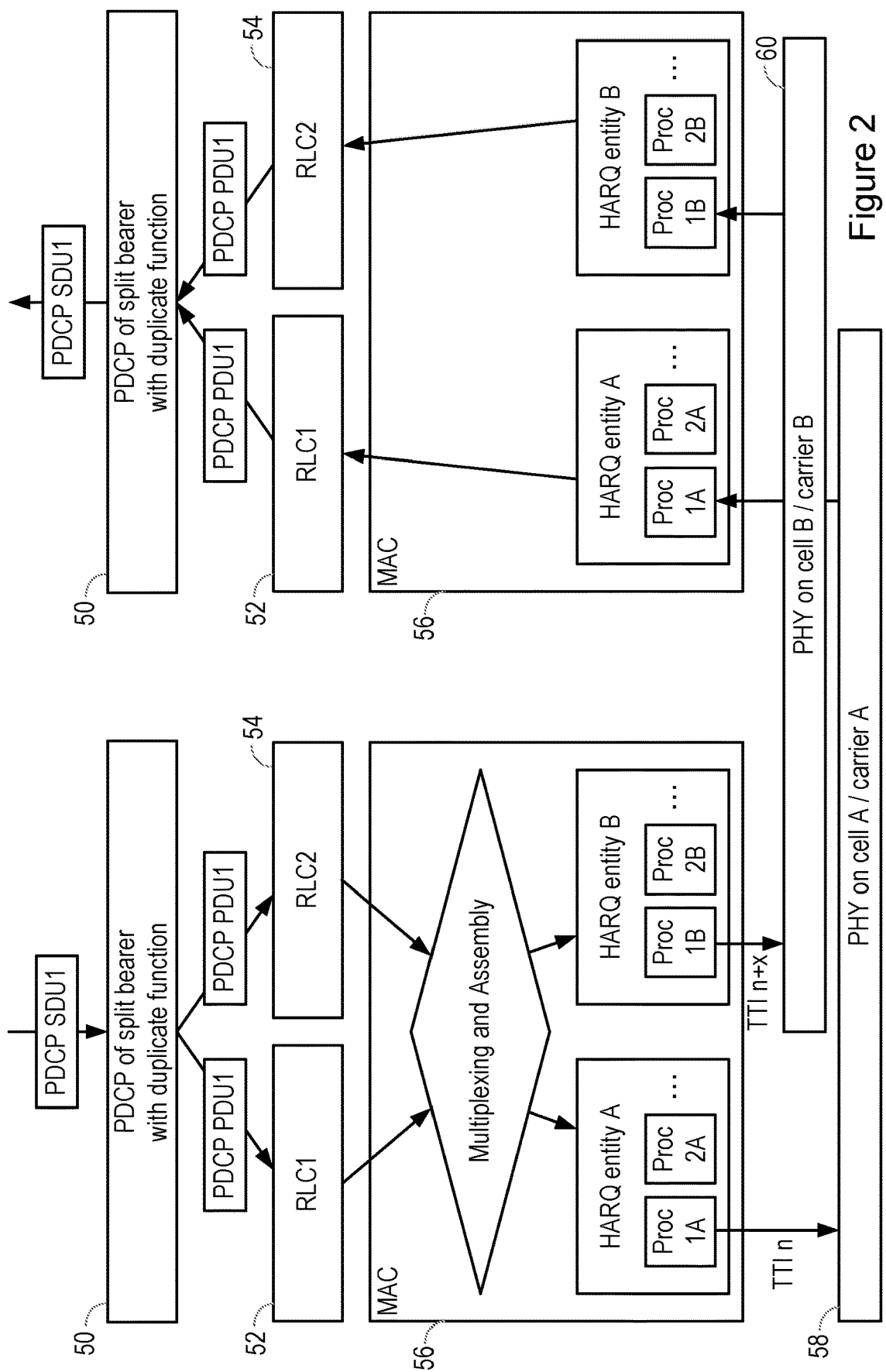
FIG. 2 shows a protocol stack operating in a node according to embodiments of the disclosure.

FIG. 2 illustrates a protocol stack by which the wireless terminal 16 is operable to communicate with the network 10 (and particularly the radio access nodes 12, 14).

The protocol stack is illustrated twice in FIG. 2: the left-hand side of the drawing shows the operation of the protocol stack when the wireless terminal 16 transmits one or more packets of data; the right-hand side shows the operation of the protocol stack when the wireless terminal 16 receives one or more signals from the network (e.g. acknowledgement messages in respect of the data packets transmitted on the left-hand side).

As will be known to the skilled person, the protocol stack is arranged in a hierarchy of layers. It will also be understood by the skilled person that FIG. 2 illustrates only that portion of the protocol stack which is necessary for an understanding of the embodiments of the disclosure. In general, the protocol stack may comprise additional layers above and/or below those shown in FIG. 2.

Reference will be made herein to "entities" belonging to a particular layer of the protocol stack. The entities may be virtual (i.e. defined in software) or non-virtual. Those skilled in the art will appreciate the meaning of this term. However, in general an entity may be considered as an object (e.g. a software object) that handles multiple processes and functions according to the layer in which the entity is defined.

The protocol stack comprises an entity 50 in the PDCP layer (hereinafter "PDCP entity"), which is the highest of the layers shown in FIG. 2. As will be known to those skilled in the art, the PDCP entity 50 receives PDCP service data units (SDUs) from higher layers, encapsulates those SDUs into larger units called PDCP protocol data units (PDUs), and passes the PDUs down to entities in lower layers of the protocol stack.

According to embodiments of the disclosure, the PDCP entity 50 may be configured to provide duplication of packets for transmission over multiple carriers, in order to increase the reliability of transmissions. The PDCP entity 50 may be configured to provide such duplication for all transmissions (i.e. traffic of all types), or certain transmission (i.e. traffic of a certain type). For example, the PDCP entity 50 may be configured to provide duplication for URLLC traffic, but not certain other types of traffic.

Thus, the PDCP entity 50 receives a PDCP SDU (called PDCP SDU1 in the illustration), and encapsulates PDCP SDU1 into PDCP PDUs (called PDCP PDU1) which are duplicates of each other. PDCP SDU1 may contain data (i.e. user plane data) or control information (i.e. control plane data). In general, PDCP SDU1 may be encapsulated with additional data (i.e. one or more further SDUs) when preparing the PDCP PDU, and thus PDCP PDU1 may contain additional data than merely that contained in PDCP SDU1.

Further, the term "duplicate" as used herein should not be understood to mean that a PDU and its duplicate are exact copies of each other in each and every respect. As will be clear from the disclosure below, the PDUs are transmitted over the physical layer (PHY) via different radio carriers, and therefore a data packet may comprise control information (e.g. a header) that differs from the control information of its duplicate in one or more respects in order to provide the different routing. Rather, the term "duplicate" should be understood to mean, and would be understood by the skilled person to mean, that a data packet is substantially duplicated. For example, a data packet and its duplicate may comprise identical data (i.e. payload), but different control information (e.g. header).

Further, references herein to a data packet "and its duplicate" should not be interpreted to mean that one of the data packets is original, while the other is a copy of the original, or that either packet takes precedence over the other. The two data packets are duplicates of each other, and may be given equal priority within the protocol stack and the network 10 as a whole.

PDCP PDU1 and its duplicate are passed from the PDCP entity PDCP entity 50, respectively, to a first entity 52 and a second entity 54 in the RLC layer (hereinafter, first RLC entity 52 and second RLC entity 54), which is a lower layer than the PDCP layer in the protocol stack. Thus one PDU is passed to the first RLC entity 52, and the other is passed to the second RLC entity 54.

The first RLC entity 52 and the second RLC entity 54 are responsible for various functions, such as error correction based on ARQ, concatenation, segmentation and reassembly of RLC SDUs, etc. The RLC entities 52, 54 are also responsible for the transfer of upper layer PDUs.

Thus, according to embodiments of the disclosure, each RLC entity 52, 54 transfers its respective PDCP PDU (which may be repackaged or encapsulated with additional data) to an entity 56 in the MAC layer (hereinafter the MAC entity 56), which is a lower layer than the RLC layer in the protocol stack. The data may be passed to the MAC entity 56 as respective RLC PDUs (which may not be duplicates of each other owing to being packaged with different data) via respective logical channels. Thus the first RLC entity 52 passes a first RLC PDU to the MAC entity 56 via a first logical channel, while the second RLC entity 54 passes a second RLC PDU to the MAC entity 56 via a second logical channel. It should be noted that in general each RLC entity may handle data for multiple different logical channels.

Each of the logical channels may be associated with restrictions as to which radio carrier data for that logical channel can be transmitted over. For example, it may be required that data associated with a particular logical channel be transmitted over a particular (named) radio carrier. Alternatively, it may be required that data for a particular logical channel be transmitted over a different radio carrier than another logical channel.

According to embodiments of the disclosure, in order to achieve the reliability gains anticipated by duplication of PDCP data, it is required that data associated with the first logical channel (i.e. that from the first RLC entity 52) is transmitted over a different radio carrier than data associated with the second logical channel (i.e. that from the second RLC entity 54). This may be achieved in a number of ways. For example, each logical channel may be restricted to transmission over particular, different radio carriers. Thus the first logical channel may be restricted to transmission over a first radio carrier, while the second logical channel may be restricted to transmission over a second radio carrier. For example, a flag may be configured for each logical channel to allow or forbid transmission over particular radio carriers, or an index naming a particular radio carrier may be associated with each logical channel. Alternative methods of implementing the restrictions will be apparent to the skilled reader without departing from the scope of this disclosure.

Thus, in the illustrated embodiment, data packets containing the duplicated data are passed to the MAC entity 56. The MAC layer is responsible for carrier aggregation, and particularly the scheduling of data for transmission over multiple aggregated carriers.

Thus the MAC entity 56 comprises a multiplexing and assembly function, which receives data from one or more entities in one or more upper layers (e.g. the first RLC entity 52 and the second RLC entity 54) and assembles that data into packets for transmission over the physical layer (PHY) for each of the multiple carriers the wireless terminal is configured with. In doing so, the MAC entity 56 may take into account any restrictions associated with the logical channels.

Thus, data associated with the first logical channel is assembled and scheduled for transmission on a first carrier/cell 58 (cell A/carrier A in the illustration), while data associated with the second logical channel is assembled and scheduled for transmission on a second carrier/cell 60 (cell B/carrier B in the illustration).

Separate HARQ (hybrid automatic repeat request) entities may be defined for each of the multiple radio carriers that the wireless terminal is configured with. Thus, the MAC entity 56 may comprise a first HARQ entity (HARQ entity A) associated with the first carrier 58, and a second HARQ entity associated with the second carried 60. Those skilled in the art will appreciate that each HARQ entity may handle one or more HARQ processes, with multiple HARQ processes being handled in parallel with each other. Thus a second data packet can be transmitted (using a second HARQ process) while a first data packet is yet to be acknowledged by the receiving party (using a first HARQ process).

In general, therefore, data for the first logical channel is transmitted using different radio resources than data for the second logical channel. In the illustrated embodiment, data for the first logical channel is transmitted during an nth time slot or time transmission interval (TTI), while data for the second logical channel is transmitted during an (n+x)th time slot or TTI, thus the data and its duplicate are transmitted at different times. However, in other embodiments, the data for the first and logical channels may be transmitted at the same time but using different frequencies, or encoded with different orthogonal codes, or any combination of these different radio resources (i.e. time, frequency and coding).

In the right-hand part of FIG. 2, acknowledgement messages are received from the cells 58, 60 in respect of the duplicated data and passed to the respective HARQ processes running in the MAC entity 56. If they are positive acknowledgements (indicating that a respective data packet was successfully received), the acknowledgements are passed to the PDCP entity 50, via the first RLC entity 52 and the second RLC entity second RLC entity 54, which processes the data and forwards it to upper layers. For example, the PDCP entity 50 may utilize only the first positive acknowledgement it receives and discard acknowledgement messages received at a later time.

In this manner, data can be duplicated over multiple radio carriers in order to increase the reliability of a particular transmission. However, duplication requires the presence of at least first and second radio carriers. If duplication is configured, but only a single radio carrier is available, the desired increase in reliability will not be achieved.

Figure 3:
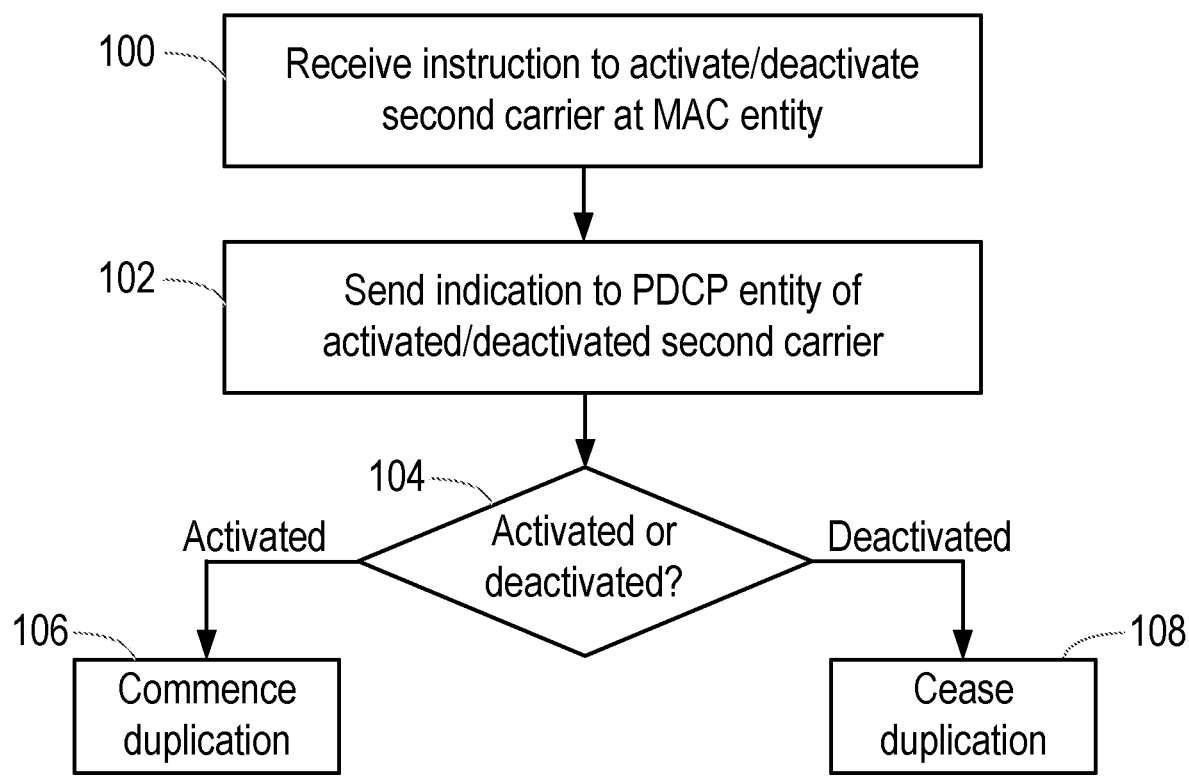
FIG. 3 is a flowchart of a method in a node according to embodiments of the disclosure.

FIG. 3 is a flowchart of a method according to embodiments of the disclosure. The method may be carried out in a node of the wireless communication network, such as the wireless terminal 16. In other embodiments, however, the method may also be carried out in a radio access node for example.

The node is operable according to a protocol stack having multiple layers. A first layer of the protocol stack (e.g. the MAC layer) is responsible for carrier aggregation, i.e. the establishment and configuration of multiple aggregated radio carriers. One of the radio carriers may be a primary radio carrier (PCell) which is always active; other radio carriers may be secondary radio carriers (SCells) which may be activated or deactivated. The MAC layer controls the activation and deactivation of such secondary radio carriers. A second layer of the protocol stack (e.g. the PDCP layer) is responsible for the duplication of packets for transmission over the multiple aggregated carriers, and the de-duplication of data packets received over the multiple aggregated carriers.

The method begins in step 100, in which a first entity of the first layer (such as the MAC entity 56) determines that a second carrier (e.g. a secondary radio carrier) has been activated or deactivated. Those skilled in the art will appreciate that a variety of different criteria may be utilised to activate or deactivate a secondary radio carrier. For example, an instruction (such as a MAC control element) may be received from the network (e.g. from a radio access node) instructing the activation or deactivation of a particular secondary carrier, or all secondary carriers. Alternatively or additionally, the second carrier may be deactivated upon expiry of an inactivity timer maintained in the node. Such a timer may be restarted upon the transmission of data over the second carrier, or the scheduling of a transmission over the second carrier. When the timer expires, the second carrier is deemed inactive and deactivated. Further still, the second carrier may be activated or deactivated in response to some event, such as handover of a wireless terminal device from one radio access node to another.

Responsive to activation or deactivation of the second carrier, in step 102 the first entity of the first layer prepares and sends an indication of the activation/deactivation to a first entity of the second layer (e.g. the PDCP entity 50). For example, if the second carrier is activated, the indication may contain an indication to that effect; similarly, if the second carrier is deactivated, the indication contain an indication to that effect. Further, in alternative embodiments, the first entity of the second layer may maintain a current status of each carrier configured for the node. In such embodiments, the indication sent by the first entity of the first layer may simply indicate that a change in the activation status has taken place (i.e. such that the first entity of the second layer changes its stored current status from activated to deactivated, or from deactivated to activated, for that second carrier).

The indication may comprise an indication of the identity of the second carrier or a cell associated with the second carrier, or an index associated with the second carrier or cell. In one embodiment, the indication may comprise a mapping of all carriers associated with the node, and respective indications as to whether the carriers are activated or deactivated. The indication may be sent as a MAC control element, for example.

The indication may be sent to the first entity of the second layer via one or more entities of an intermediate layer between the first layer and the second layer in the protocol stack (e.g. the RLC layer).

For example, in embodiments where data packets are duplicated and sent for transmission via separate RLC entities and separate logical channels (see discussion above with respect to FIG. 2), the indication may be sent from the first entity of the first layer only via that entity or those entities in the intermediate layer handling logical channels which are not restricted from transmitting over the second carrier. Thus, in one embodiment, indications may not be sent to all entities in the intermediate layer, but only those handling logical channels that are permitted to utilise the second carrier.

Upon receipt, the entities in the intermediate layer may forward the indication to the first entity of the second layer. For example, particularly in embodiments where the first entity of the first layer sends indication only to certain entities in the intermediate layer, those entities may forward the indications without further substantive processing.

In alternative embodiments, however, including embodiments where the first entity in the first layer sends indications to all entities in the intermediate layer, the entities in the intermediate layer may determine whether it is appropriate for the indication to be forwarded to the first entity of the second layer. For example, if the logical channel(s) handled by a particular entity in the intermediate layer are restricted from transmission over the second carrier, the particular entity may not forward the indication to the first entity of the second layer. If the logical channel(s) handled by the particular entity are permitted to use the second carrier, the particular entity may forward the indication to the first entity of the second layer.

In still further embodiments, a particular entity of the intermediate layer may determine whether a logical channel handled by it relates to data packets that are configured for duplication in the first entity of the second layer. If so, the entity may forward the indication to the first entity of the second layer; if not, the entity may not forward the indication.

In further embodiments, responsive to a determination that the indication relates to deactivation of the second carrier, which is the only carrier an entity of the intermediate layer is able to transmit owing to logical channel restrictions, and after forwarding the indication, the entity of the intermediate layer may flush its data (e.g. data stored in buffers for the entity) and reset its state for future re-use in case the second carrier is re-activated. Alternatively, the entity may be released. Thus, in such embodiments, when a particular carrier is activated, the corresponding entity in the intermediate layer is established or re-established; when the carrier is deactivated, the corresponding entity in the intermediate layer is released or suspended.

In yet further embodiments, the indication may be forwarded without further processing by any and all entities of the intermediate layer that receive it from the first entity of the first layer. In such embodiments, the first entity of the second layer may determine the logical channels associated with the second carrier and separately instruct the entities of the intermediate layer handling those logical channels that they can be released or reset, as indicated above.

In step 104, the first entity of the second layer (e.g. the PDCP entity 50) receives the indication and determines whether the indication is an indication that the second carrier has been activated or de-activated. If the second carrier has been activated, the process moves to step 106, in which, if the first entity of the second layer has been configured to duplicate traffic (and the second carrier was established for that purpose), the entity commences duplication of traffic for transmission over the first and second carriers. See FIG. 2 for a description of this process. If the second carrier has been deactivated, the method proceeds to step 108, in which, if the first entity of the second layer has been configured to duplicate traffic for transmission over the second carrier, the entity ceases such duplication of traffic.

Figure 4:
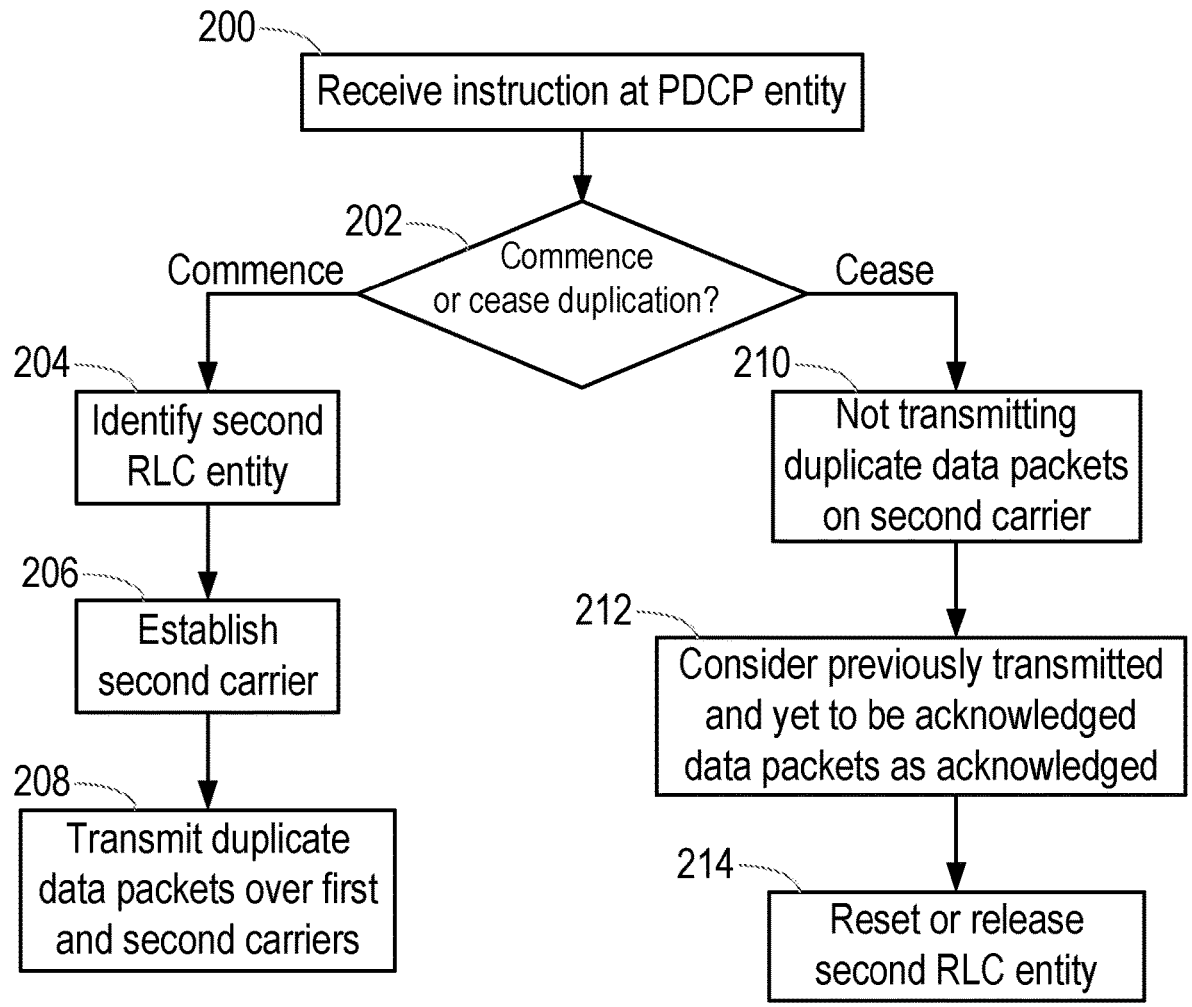
FIG. 4 is a flowchart of a method in a node according to further embodiments of the disclosure.

FIG. 4 is a flowchart of a method according to further embodiments of the disclosure. The method may be carried out in a node of the wireless communication network, such as the wireless terminal 16. In other embodiments, however, the method may also be carried out in a radio access node for example.

The node is operable according to a protocol stack having multiple layers. A first layer of the protocol stack (e.g. the MAC layer) is responsible for carrier aggregation, i.e. the establishment and configuration of multiple aggregated radio carriers. One of the radio carriers may be a primary radio carrier (PCell) which is always active; other radio carriers may be secondary radio carriers (SCells) which may be activated or deactivated. The MAC layer controls the activation and deactivation of such secondary radio carriers. A second layer of the protocol stack (e.g. the PDCP layer) is responsible for the duplication of packets for transmission over the multiple aggregated carriers, and the de-duplication of data packets received over the multiple aggregated carriers. In some embodiments, the protocol stack may also comprise an intermediate layer between the first and second layers (e.g. the RLC layer).

The method begins in step 200, in which a first entity of the second layer (e.g. the PDCP entity 50) receives an instruction to commence or cease duplication of data packets over first and second aggregated carriers. See FIG. 2 for a description of the duplication process. For example, the instruction may be received from another node of the network (such as a radio access node), and may be received by high-level signalling such as RRC signalling. In some embodiments, the instruction may be an instruction to commence or cease duplication only in respect of certain types of traffic, such as URLLC traffic.

In step 202, the first entity of the second layer determines whether the instruction is an instruction to commence duplication or to cease duplication. The node is assumed to be configured already with at least a first carrier (e.g. a primary carrier or PCell), and may also be configured with one or more second carriers (e.g. a secondary carrier or SCell).

If an instruction to commence duplication, the method proceeds to step 204, in which the first entity of the second layer identifies an entity of the intermediate layer to which duplicated data can be forwarded for transmission over a second carrier. This step may comprise establishing the entity itself, or selecting a pre-existing entity that has capacity to handle the traffic. In the latter case, the pre-existing entity may have previously been created for the purpose of handling duplicated traffic, but later stopped due to deactivation of a carrier, or the ceasing of data duplication.

The method proceeds to step 206 in which, if not already established, a second carrier is established between the node and another node of the network. Those skilled in the art will understand the procedure for establishing a secondary carrier with a network and therefore this process is not further described herein. If a second carrier is already established, this step may be omitted.

In step 208, the first entity of the second layer commences duplication of data packets, according to the instruction received in step 200, for transmission over the first carrier and the second carrier. For example, the first entity of the second layer may indicate that it has data available for transmission over the second carrier. This process is described above with respect to FIG. 2.

If, in step 202, it is determined that the instruction is an instruction to cease duplication of data packets (and thus the node is already configured with a second carrier), the method proceeds to step 210. In this step, the first entity of the second layer does not transmit duplicate data packets on the second carrier, and thus does not indicate to lower layers (e.g. the intermediate layer or the first layer) that it has data available for transmission over the second carrier. For example, the first entity of the second layer may not indicate to the associated entity in the intermediate layer that it has data available for transmission for the logical channel established for the purposes of duplicated data and handled by that entity in the intermediate layer (see FIG. 2).

In step 212, the first entity of the second layer may consider that data packets previously transmitted over the second carrier for which no acknowledgement has yet been received (see the right-hand side of FIG. 2) as unacknowledged, thus mandating that such packets be re-transmitted over a different carrier (e.g. the first carrier).

In step 214, the first entity may provide an indication to one or more entities in the intermediate layer that duplication has been ceased. In response to receipt of such an indication, an entity in the intermediate layer associated with the logical channel(s) carrying duplicated data may flush its data (e.g. data stored in buffers for the entity) and reset its state for future re-use in case the second carrier is re-activated. Alternatively, the entity may be released. Thus, in such embodiments, when a particular carrier is activated, the corresponding entity in the intermediate layer is established or re-established; when the carrier is deactivated, the corresponding entity in the intermediate layer is released or suspended.

Step 214 may comprise the first entity in the second layer sending such an indication to all entities in the intermediate layer, or only those entities associated with the duplicated traffic. In the former case, the entities may determine whether the indication relates to logical channels handled by them. If the indication relates to logical channels not handled by a particular entity in the intermediate layer, the indication may be discarded or ignored.

Figure 5:
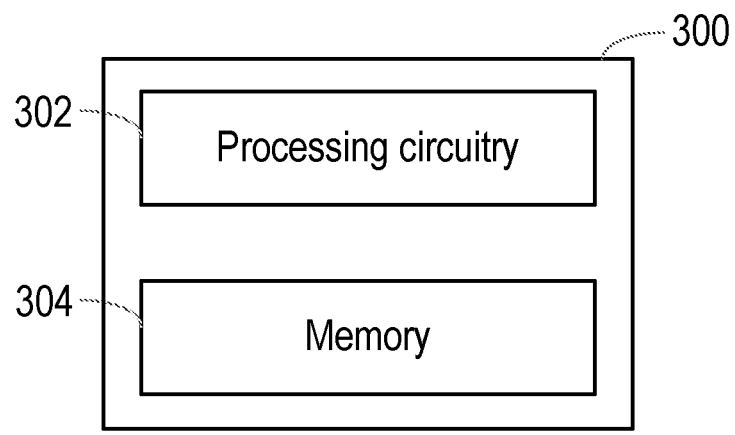
FIG. 5 is a schematic diagram of a node according to further embodiments of the disclosure.

FIG. 5 is a schematic diagram of a node 300 according to embodiments of the disclosure. For example, the node 300 may correspond to the wireless terminal 16 described above. The device may be suitable for performing the method described above with respect to FIG. 3 or 4.

The node 300 may be configurable with a plurality of radio carriers for radio transmission between the node and one or more other nodes of a wireless communication network. The plurality of radio carriers comprise at least a first carrier and a second carrier. The node 300 is operable according to a protocol stack comprising at least a first layer and a second layer, wherein the second layer is higher than the first layer, wherein the first layer is responsible for aggregation of the first and second radio carriers, and wherein the second layer is responsible for duplication of data packets for transmission over the first and second carriers.

The node 300 comprises processing circuitry 302 and a non-transitory machine-readable medium 304 storing instructions which may be executed by the processing circuitry 302.

In one embodiment, execution of the instructions by the processing circuitry causes the node 300 to: determine, at a first entity of the first layer, that the second carrier is activated or deactivated; and send, from the first entity of the first layer to a first entity of the second layer, an indication of the activation or deactivation of the second carrier.

In another embodiment, execution of the instructions by the processing circuitry causes the node 300 to: receive, at a first entity of the second layer, an instruction to commence or cease duplication of packets over the first and second carriers; and send, from the first entity of the second layer to a first entity of the first layer, a request to activate or deactivate the second carrier.

The node 300 may also generally comprise hardware and/or software for transmitting and receiving wireless signals, such as one or more antennas, and transceiver circuitry coupled to the one or more antennas.

Figure 6:
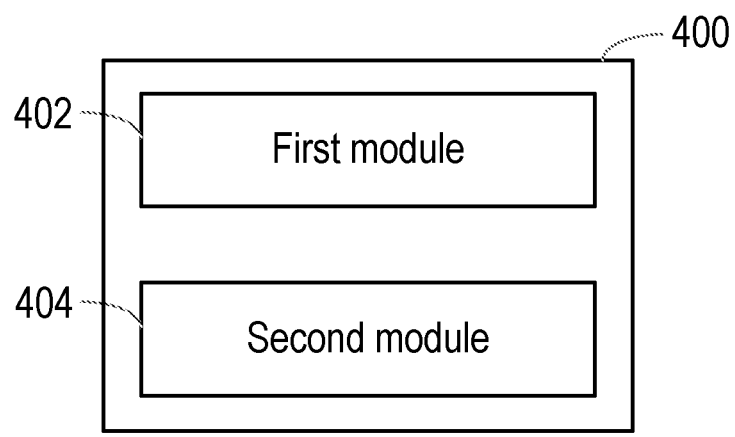
FIG. 6 is a schematic diagram of a node according to further embodiments of the disclosure.

FIG. 6 is a schematic diagram of a node 400 according to further embodiments of the disclosure. For example, the node 400 may correspond to the wireless terminal 16 described above. The device may be suitable for performing the method described above with respect to FIG. 3 or 4.

The node 300 may be configurable with a plurality of radio carriers for radio transmission between the node and one or more other nodes of a wireless communication network. The plurality of radio carriers comprise at least a first carrier and a second carrier. The node 300 is operable according to a protocol stack comprising at least a first layer and a second layer, wherein the second layer is higher than the first layer, wherein the first layer is responsible for aggregation of the first and second radio carriers, and wherein the second layer is responsible for duplication of data packets for transmission over the first and second carriers.

The node 400 comprises a first module 402 and a second module 404.

In one embodiment, the first module is a module in a first entity of the first layer, and is configured to determine that the second carrier is activated or deactivated. The second module is also in the first entity of the first layer, and is configured to send an indication of the activation or deactivation of the second carrier to a first entity of the second layer.

In another embodiment, the first module is in a first entity of the second layer, and is configured to receive an instruction to commence or cease duplication of packets over the first and second carriers. The second module is also in the first entity of the second layer, and is configured to send a request to activate or deactivate the second carrier to a first entity of the first layer.

The node 400 may also generally comprise one or more modules for transmitting and receiving wireless signals, such as one or more antennas, and one or more transceiver modules coupled to the one or more antennas.

Thus embodiments of the disclosure provide methods and apparatus that allow a node to duplicate data packets for transmission over first and second carriers, to configure such carriers in response to instructions to commence or cease duplication, and to commence or cease duplication in response to changing configuration of the carriers.

The invention claimed is:

1. A method in a node for a wireless communication network, the node being configurable with a plurality of radio carriers for radio transmission between the node and one or more other nodes of the wireless communication network, the plurality of radio carriers comprising at least a first carrier and a second carrier, the node being operable according to a protocol stack comprising at least a first layer and a second layer, wherein the second layer is higher than the first layer, wherein the first layer is responsible for aggregation of the first and second carriers, and wherein the second layer is responsible for duplication of data packets for transmission over the first and second carriers, the method comprising:
   determining, at a first entity of the first layer, that the second carrier is activated or deactivated; and
   sending, from the first entity of the first layer to a first entity of the second layer, an indication of the activation or deactivation of the second carrier,
   wherein the first entity of the second layer is configured to commence duplication of data packets, if the indication indicates that the second carrier is activated, and cease duplication of data packets if the indication indicates that the second carrier is de-activated.

2. The method according to claim 1, wherein the indication comprises an indication of an identity or an index of one or more of the second carrier and a cell associated with the second carrier.

3. The method according to claim 1, wherein:
   the protocol stack further comprises at least one intermediate layer between the first layer and the second layer, and
   the indication of the activation or deactivation of the second carrier is sent from the first entity of the first layer to the first entity of the second layer via one or more entities of one of the at least one intermediate layer.

4. The method according to claim 3, wherein:
   the first entity of the second layer is configured to send the first data packet and the second data packet to a first entity of the intermediate layer and a second entity of the intermediate layer respectively, and
   the first and second entities of the intermediate layer are configured to send the first data packet and the second data packet, respectively, to one or more entities of the first layer for transmission over the first and second carriers, respectively.

5. The method according to claim 1, wherein:
   the protocol stack further comprises at least one intermediate layer between the first layer and the second layer, and
   wherein the sending comprises sending the request to activate or deactivate the second carrier via one or more entities of at least one of the at least one intermediate layer.

6. The method according to claim 5, wherein the node comprises a first entity of the intermediate layer, the method further comprising:
responsive to a determination that the indication is an instruction to commence
duplication of packets over the first and second carriers, identifying a second entity of the intermediate layer; and
sending a first data packet and a second data packet that are duplicates of each other for transmission via the first entity and the second entity of the intermediate layer, respectively.

7. The method according to claim 6, wherein identifying the second entity of the intermediate layer comprises:
establishing the second entity of the intermediate layer; or
identifying a pre-existing entity as the second entity of the intermediate layer.

8. The method according to claim 7, further comprising:
sending the first and second data packets from the first and second entities of the intermediate layer, respectively, to the first entity of the first layer, for transmission over the first and second carriers, respectively.

9. The method according to claim 8, wherein the first and second data packets are sent from the first and second entities of the intermediate layer via first and second logical channels, respectively.

10. The method according to claim 1, wherein the first entity of the second layer is configured to create a first data packet and a second data packet, which are duplicates of each other, and send the first data packet and the second data packet for transmission over the first carrier and the second carrier, respectively.

11. A node for a wireless communication network, the node being configurable with a plurality of radio carriers for radio transmission between the node and one or more other nodes of the wireless communication network, the plurality of radio carriers comprising at least a first carrier and a second carrier, the node being operable according to a protocol stack comprising at least a first layer and a second layer, wherein the second layer is higher than the first layer, wherein the first layer is responsible for aggregation of the first and second radio carriers, and wherein the second layer is responsible for duplication of data packets for transmission over the first and second carriers, the node comprising processing circuitry and a non-transitory machine-readable medium storing code which, when executed by the processing circuitry, causes the node to:
determine, at a first entity of the first layer, that the second carrier is activated or deactivated; and
send, from the first entity of the first layer to a first entity of the second layer, an indication of the activation or deactivation of the second carrier,
wherein the first entity of the second layer is configured to commence duplication of data packets for transmission over the second carrier in responsive to a determination that the indication is an indication of the activation of the second carrier and cease duplication of data packets for transmission over the second carrier in responsive to a determination that the indication is an indication of the deactivation of the second carrier.

12. The node according to claim 11, wherein the indication comprises an indication of an identity or an index of one or more of the second carrier and a cell associated with the second carrier.

* * * * *